(12) United States Patent
Ryu et al.

(10) Patent No.: US 7,305,841 B2
(45) Date of Patent: Dec. 11, 2007

(54) COGENERATION SYSTEM

(75) Inventors: Yun Ho Ryu, Seoul (KR); Eun Jun Cho, Buchun-si (KR); Yoon Jei Hwang, Seoul (KR); Cheol Min Kim, Anyang-si (KR); Cheol Soo Ko, Kunpo-si (KR)

(73) Assignee: LG Electronics Inc., Sseoul (KR)

( * ) Notice: Subject to any disclaimer, the term of this patent is extended or adjusted under 35 U.S.C. 154(b) by 239 days.

(21) Appl. No.: 11/155,484

(22) Filed: Jun. 20, 2005

(65) Prior Publication Data

US 2006/0123821 A1 Jun. 15, 2006

(30) Foreign Application Priority Data

Dec. 10, 2004 (KR) ...................... 10-2004-0104366

(51) Int. Cl.
*F25B 27/02* (2006.01)
(52) U.S. Cl. ..................................... 62/238.7; 62/238.6
(58) Field of Classification Search ..... 62/238.6–238.7
See application file for complete search history.

(56) References Cited

U.S. PATENT DOCUMENTS

| | | | | |
|---|---|---|---|---|
| 4,178,772 A | * | 12/1979 | Swenson et al. | ........... 62/238.6 |
| 6,735,969 B2 | * | 5/2004 | Kasagi et al. | .............. 62/238.7 |
| 6,769,481 B2 | * | 8/2004 | Yoshimura et al. | ......... 165/240 |

* cited by examiner

*Primary Examiner*—William E. Tapolcai
(74) *Attorney, Agent, or Firm*—Birch, Stewart, Kolasch & Birch, LLP

(57) ABSTRACT

A cogeneration system is disclosed. The cogeneration system includes a heat pump type air conditioner, a waste heat recoverer to recover waste heat of a drive source, a waste heat supplying heat exchanger, which is heated by the waste heat recovered by the waste heat recoverer, and a bypassing unit, which causes the waste heat supplying heat exchanger to function as an evaporator during a heating operation of the heat pump type air conditioner. In accordance with this arrangement, it is possible to enhance the heating capacity of the heat pump type air conditioner irrespective of outdoor temperature, to prevent damage of compressors, and to minimize power consumption.

17 Claims, 9 Drawing Sheets

COGENERATION SYSTEM

BACKGROUND OF THE INVENTION

1. Field of the Invention

The present invention relates to a cogeneration system in which waste heat of a drive source adapted to drive a generator is used in a heat pump type air conditioner, and, more particularly, to a cogeneration system which includes a waste-heat-supplied heat exchanger to heat a refrigerant, using waste heat of a drive source, during a heating operation of a heat pump type air conditioner.

2. Description of the Related Art

FIG. 1 is a schematic view illustrating a conventional cogeneration system.

As shown in FIG. 1, the conventional cogeneration system includes a generator 2 to generate electricity, a drive source 10, which operates to drive the generator 2, and generates waste heat during the operation thereof, such as an engine (hereinafter, the drive source 10 will be referred to as an "engine"), a waste heat recoverer 20 to recover waste heat generated from the engine 10, and a heat consumer 30 to use the waste heat recovered by the waste heat recoverer 20, such as a thermal storage tank.

The electricity generated from the generator 2 is supplied to various electric home appliances including the heat pump type air conditioner 4 and various home illumination devices.

The generator 2 and engine 10 are disposed in an engine room E defined in a chassis (not shown), which is constructed separately from the heat consumer 30.

The heat pump type air conditioner 4 includes compressors 5, a 4-way valve 6, indoor heat exchangers 7, expansion devices 8, and outdoor heat exchangers 9.

When the heat pump type air conditioner operates in a cooling mode, each compressor 5 compresses a refrigerant introduced thereinto. The compressed refrigerant passes through the 4-way valve 6, outdoor heat exchangers 9, expansion devices 8, indoor heat exchangers 7, and 4-way valve 6, in this order, and returns to the compressors 5. In this case, each outdoor heat exchanger 9 functions as a condenser, and each indoor heat exchanger 7 functions as an evaporator to absorb heat from indoor air.

On the other hand, when the heat pump type air conditioner operates in a heating mode, the refrigerant compressed in each compressor 5 passes through the 4-way valve 6, indoor heat exchangers 7, expansion devices 8, outdoor heat exchangers 9, and 4-way valve 6, in this order, and returns to the compressors 9. In this case, each outdoor heat exchanger 9 functions as an evaporator, and each indoor heat exchanger 7 functions as a condenser to heat indoor air.

The waste heat recoverer 20 includes an exhaust gas heat exchanger 22 to absorb heat from exhaust gas discharged from the engine 10, and a cooling water heat exchanger 24 to absorb heat from cooling water used to cool the engine 10.

The exhaust gas heat exchanger 22 is connected with the heat consumer 30 via a first heat supply line 23. Accordingly, the exhaust gas heat exchanger 22 can transfer the waste heat absorbed from the exhaust gas of the engine 10 to the heat consumer 30 via the first heat supply line 23. As mentioned above, the heat consumer 30 may be a thermal storage tank.

The cooling water heat exchanger 24 is connected with the heat consumer 30 via a second heat supply line 24. Accordingly, the cooling water heat exchanger 24 can transfer the waste heat absorbed from the cooling water of the engine 10 to the heat consumer 30 via the second heat supply line 24.

In the above-mentioned conventional cogeneration system, however, the waste heat of the engine 10 is used only in the heat consumer 30, without being used in the heat pump type air conditioner 4. As a result, it is impossible to obtain maximal system efficiency.

SUMMARY OF THE INVENTION

The present invention has been made in view of the above-mentioned problems, and it is an object of the invention to provide a cogeneration system, which includes a waste-heat-supplied heat exchanger that is heated by waste heat of an engine during a heating operation of a heat pump type air conditioner, so as to evaporate a refrigerant, thereby being capable of enhancing the heating capacity of the heat pump type air conditioner, preventing compressor damage, and minimizing power consumption.

In accordance with the present invention, this object is accomplished by providing a cogeneration system comprising: a heat pump type air conditioner including a compressor, a 4-way valve, an indoor heat exchanger, expansion devices, and an outdoor heat exchanger; a generator to generate electricity; a drive source, which operates to drive the generator, and generates waste heat during the operation of the drive source; a waste heat recoverer to recover the waste heat of the drive source; a waste heat supplying heat exchanger, which is heated by the waste heat recovered by the waste heat recoverer; and a bypassing unit to guide a refrigerant such that the refrigerant, which is expanded while passing through the expansion devices, during a heating operation of the heat pump type air conditioner, bypasses the outdoor heat exchanger, and enters the 4-way valve after being evaporated in the waste heat supplying heat exchanger, and such that the refrigerant, which is compressed in the compressor during a cooling operation of the heat pump type air conditioner, bypasses the waste heat supplying heat exchanger, and passes through the outdoor heat exchanger while being condensed in the outdoor heat exchanger.

The cogeneration system may further comprise a radiating heat exchanger to radiate the waste heat recovered by the waste heat recoverer, and a waste heat distributor to distribute the waste heat recovered by the waste heat recoverer to the waste heat supplying heat exchanger and the radiating heat exchanger.

The cogeneration system may further comprise a heat medium circulation conduit, which connects the waste heat recoverer and the waste heat supplying heat exchanger, and through which a heat medium is circulated, a radiating bypass conduit, which connects the radiating heat exchanger and the heat medium circulation conduit, and guides the heat medium passing through the heat medium circulation conduit to bypass the waste heat supplying heat exchanger. In this case, the waste heat distributor may comprise a 3-way valve arranged at an inlet of the radiating bypass conduit.

The waste heat recoverer may comprise a cooling water heat exchanger to recover waste heat of cooling water used to cool the drive source, a first exhaust gas heat exchanger to recover waste heat of exhaust gas generated from the drive source, and a second exhaust gas heat exchanger to recover the waste heat of the exhaust gas remaining after being absorbed in the first exhaust gas heat exchanger.

The cogeneration system may further comprise a heat transfer unit to transfer heat from the cooling water heat exchanger, the first exhaust gas heat exchanger, and the second exhaust gas heat exchanger to the waste heat supplying heat exchanger.

The cogeneration system may further comprise a heat transfer unit to transfer heat from at least one of the cooling water heat exchanger, the first exhaust gas heat exchanger, and the second exhaust gas heat exchanger to the waste heat supplying heat exchanger, a second waste heat supplying heat exchanger to heat the refrigerant, which is compressed in the compressor during the heating operation of the heat pump type air conditioner, and a second heat transfer unit to transfer heat from the remaining one or ones of the cooling water heat exchanger, the first exhaust gas heat exchanger, and the second exhaust gas heat exchanger to the second waste heat supplying heat exchanger.

The bypassing unit may comprise an outdoor heat exchanger bypass conduit to guide the refrigerant, which is expanded by the expansion devices, during the heating operation of the heat pump type air conditioner, to bypass the outdoor heat exchanger, a waste heat supplying heat exchanger connecting conduit to guide the refrigerant, which is bypassed through the outdoor heat exchanger bypass conduit during the heating operation of the heat pump type air conditioner, to be introduced into the 4-way valve after passing through the waste heat supplying heat exchanger, and a waste heat supplying heat exchanger bypass conduit to guide the refrigerant, which passes through the 4-way valve during the cooling operation of the heat pump type air conditioner, to bypass the waste heat supplying heat exchanger.

The bypassing unit may comprise a first-heating operation control valve arranged at the outdoor heat exchanger bypass conduit, a second heating operation control valve arranged at the waste heat supplying heat exchanger connecting conduit, a first cooling operation control valve arranged between an inlet of the outdoor heat exchanger bypass conduit and the outdoor heat exchanger, a second cooling operation control valve arranged between an outlet of the outdoor heat exchanger bypass conduit and the outdoor heat exchanger, and a third cooling operation control valve arranged at the waste heat supplying heat exchanger bypass conduit.

Each of the first and second heating operation control valves, and the first, second and third cooling operation control valves, may be an ON/OFF valve.

The cogeneration system may further comprise a chassis, in which the generator, the drive source, the waste heat recoverer, and the waste heat supplying heat exchanger are arranged. In this case, the outdoor heat exchanger bypass conduit, the first heating operation control valve, the first cooling operation control valve, and the second cooling operation control valve may be arranged in the heat pump type air conditioner. Also, the waste heat supplying heat exchanger bypass conduit, the second heating operation control valve, and the third cooling operation control valve may be arranged in the chassis.

Alternatively, the outdoor heat exchanger bypass conduit, the waste heat supplying heat exchanger bypass conduit, the first and second heating operation control valves, and the first, second and third cooling operation control valves may be arranged in the heat pump type air conditioner.

The bypassing unit may comprise first and second 3-way valves, respectively arranged at an inlet of the outdoor heat exchanger bypass conduit and an outlet of the outdoor heat exchanger bypass conduit, third and fourth 3-way valves, respectively arranged at an inlet of the waste heat supplying heat exchanger bypass conduit and an outlet of the waste heat supplying heat exchanger bypass conduit.

The cogeneration system having the above-described configuration according to the present invention have advantages in that it is possible to enhance the heating capacity of the heat pump type air conditioner irrespective of outdoor temperature, and to prevent damage of the compressors because the cogeneration system includes the waste heat recoverer to recover the waste heat of the drive source to drive the generator, the waste heat supplying heat exchanger, which is heated by the waste heat recovered by the waste heat recoverer, and the bypassing unit, which causes the waste heat supplying heat exchanger to function as an evaporator during the heating operation of the heat pump type air conditioner.

Also, the cogeneration system according to the present invention has advantages in that it is possible to re-use waste heat only for required purposes, and to cope with an overload of the heat pump type air conditioner because the cogeneration system includes the radiating heat exchanger to radiate the heat recovered by the waste heat recoverer, and a waste heat distributor to distribute the heat recovered by the waste heat recoverer to the waste heat supplying heat exchanger and radiating heat exchanger.

The cogeneration system according to the present invention also has advantages in that it is possible to use the waste heat of the engine not only in the heat pump type air conditioner, but also in the water heating tank or thermal storage tank because the radiating heat exchanger is partially or entirely arranged in at least one of the water heating tank and thermal storage tank.

The cogeneration system according to the present invention also has advantages in that it is possible to enhance the heating performance of the heat pump type air conditioner to the maximum, and to minimize the power consumption required to drive the compressors, correspondingly to the heating performance enhancement, because the waste heat of the engine is partially transferred to the waste heat supplying heat exchanger, and the remaining portion of the waste heat is transferred to the second waste heat supplying heat exchanger adapted to heat the refrigerant compressed in the compressors, so that the refrigerant is supplied to the indoor heat exchangers after being heated by the second waste heat supplying heat exchanger.

The cogeneration system according to the present invention also has an advantage in that it is possible to bypass the refrigerant, using a simple arrangement, because the bypassing unit includes the outdoor heat exchanger bypass conduit, waste heat supplying heat exchanger connecting conduits, waste heat supplying heat exchanger bypass conduit, first and second heating operation control valves, and first through third cooling operation control valves.

In addition, the cogeneration system according to the present invention has an advantage in that it is possible to bypass the refrigerant, using a minimal number of valves, because the bypassing unit includes the outdoor heat exchanger bypass conduit, waste heat supplying heat exchanger connecting conduits, waste heat supplying heat exchanger bypass conduit, and first through fourth 3-way valves.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Figure 1:
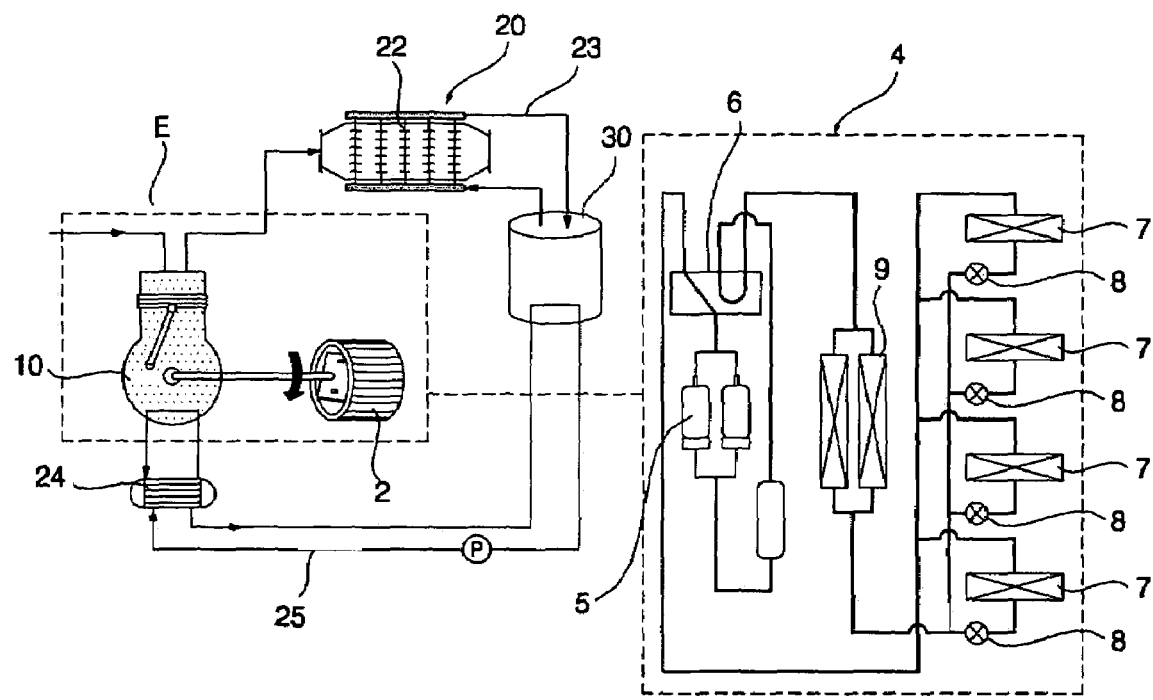
FIG. 1 is a schematic view illustrating a conventional cogeneration system.

Hereinafter, exemplary embodiments of a cogeneration system according to the present invention will be described with reference to the annexed drawings. In the following description, identical elements are referred to by the same title and designated by the same reference numeral, without any redundant description thereof.

Figure 2:
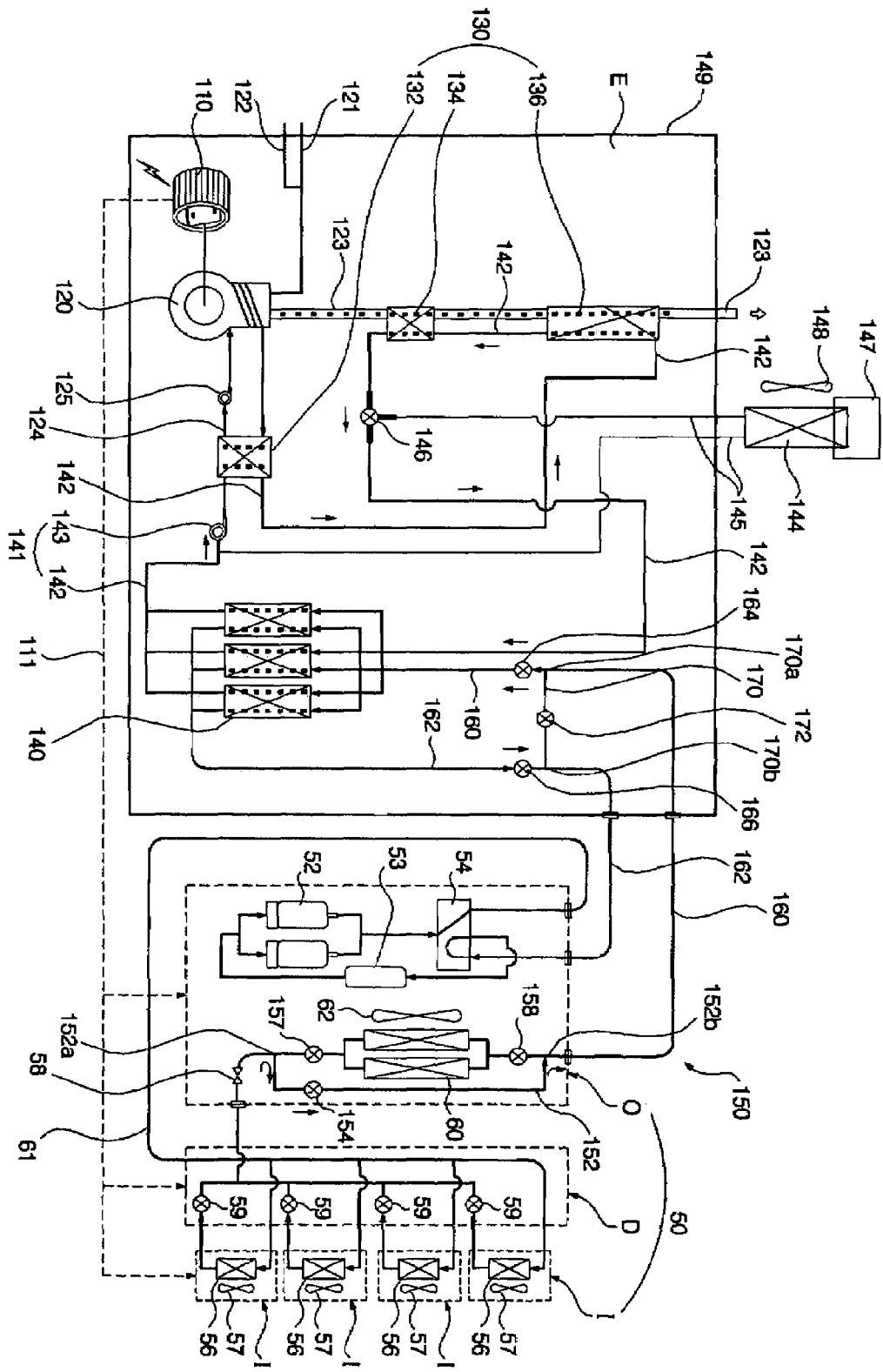
FIG. 2 is a schematic diagram of a cogeneration system according to a first embodiment of the present invention, illustrating a heat medium flow and a refrigerant flow generated during a heating operation of a heat pump type air conditioner included in the cogeneration system.
Figure 3:
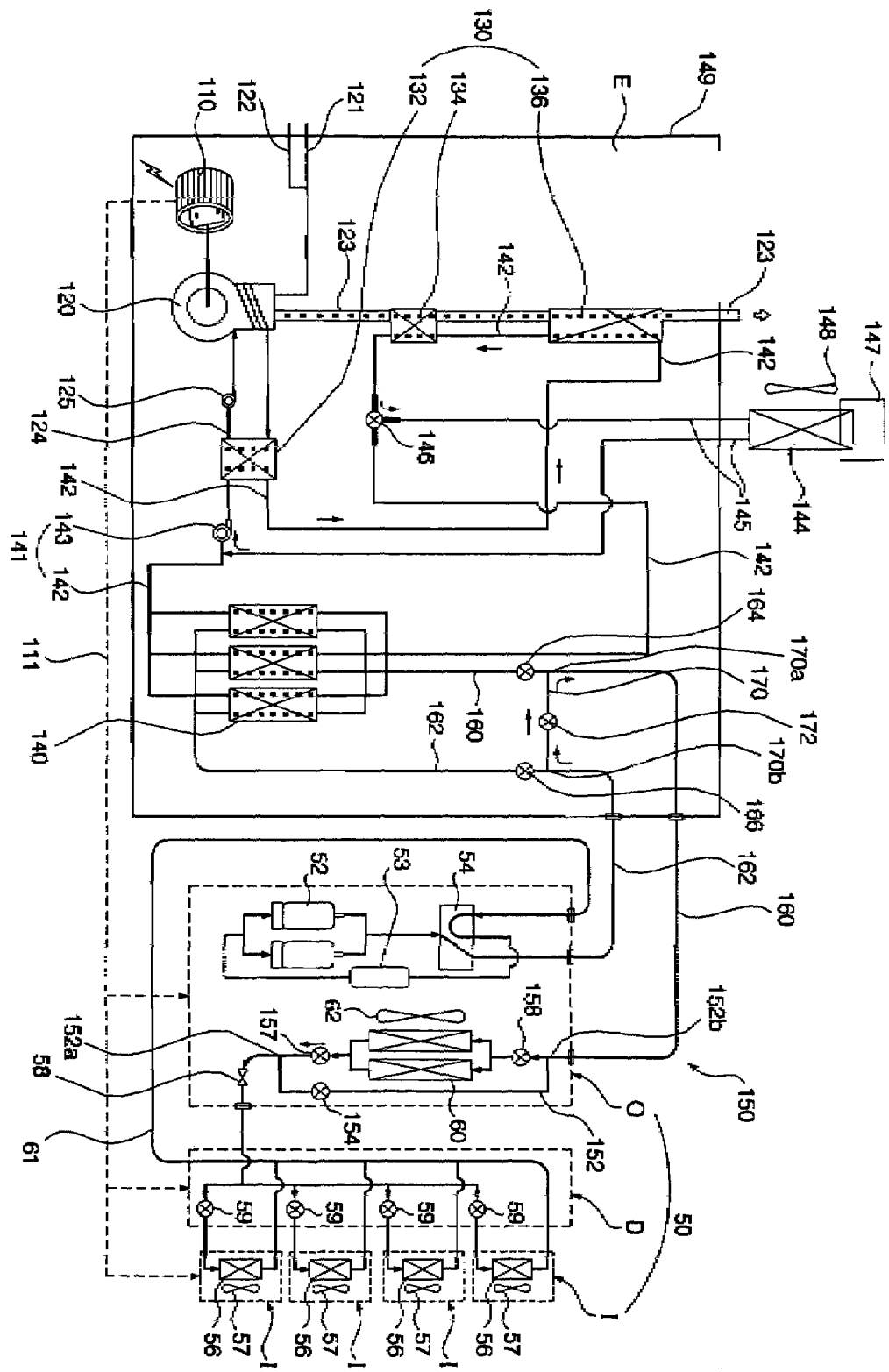
FIG. 3 is a schematic diagram of the cogeneration system according to the first embodiment of the present invention, illustrating a heat medium flow and a refrigerant flow generated during a cooling operation of the heat pump type air conditioner.

FIG. 2 is a schematic diagram of a cogeneration system according to a first embodiment of the present invention, illustrating a heat medium flow and a refrigerant flow generated during a heating operation of a heat pump type air conditioner included in the cogeneration system. FIG. 3 is a schematic diagram of the cogeneration system according to the first embodiment of the present invention, illustrating a heat medium flow and a refrigerant flow generated during a cooling operation of the heat pump type air conditioner.

As shown in FIGS. 2 and 3, the cogeneration system according to this embodiment includes a heat pump type air conditioner 50, which includes compressors 52, a 4-way valve 54, indoor heat exchangers 56, an expansion device 58, and expansion devices 59, and outdoor heat exchangers 60. The cogeneration system also includes a generator 110 to generate electricity, and a drive source 120, which operates to drive the generator 110, and generates waste heat during the operation thereof. The cogeneration system further includes a waste heat recoverer 130 to recover the waste heat of the drive source 120, and waste heat supplying heat exchangers 140, which are heated by the waste heat recoverer 130. The cogeneration system further includes a bypassing unit 150 to guide a refrigerant such that the refrigerant, which is expanded while passing through the expansion devices 58 and 59 during a heating operation of the heat pump type air conditioner 50, bypasses the outdoor heat exchanger 60, and enters the 4-way valve 54 after being evaporated in the waste heat supplying heat exchangers 140, and such that the refrigerant, which is compressed in the compressors 52 during a cooling operation of the heat pump type air conditioner 50, bypasses the waste heat supplying heat exchangers 140, and passes through the outdoor heat exchangers 60 while being condensed in the outdoor heat exchangers 60.

The 4-way valve 54 controls an inner refrigerant path established in the heat pump type air conditioner 50 to guide the refrigerant compressed by the compressors 52 to the indoor heat exchangers 56 during the heating operation of the heat pump type air conditioner 50, as shown in FIG. 2, and to guide the refrigerant compressed by the compressors 52 to the outdoor heat exchangers 60, as shown in FIG. 3.

An indoor fan 57 is arranged near each indoor heat exchanger 56 to blow indoor air to the indoor heat exchanger 56.

Each of the expansion devices 58 and 59 comprises a capillary tube or a linear expansion valve (LEV). For simplicity of description, the following description will be given only in conjunction with the case in which each of the expansion devices 58 and 59 comprises an LEV.

An outdoor fan 62 is arranged near the outdoor heat exchangers 60 to blow outdoor air to the outdoor heat exchangers 60.

The compressors 52, 4-way valve 54, and outdoor heat exchangers 60 constitute an outdoor unit O of the heat pump type air conditioner 50.

The indoor heat exchangers 56 constitute respective indoor units I of the heat pump type air conditioner 50.

The expansion device 58 is a common expansion device, which is arranged in the outdoor unit O, whereas the expansion devices 59 are individual expansion devices, which constitute a distributor D.

Although the heat pump type air conditioner 50 includes a plurality of indoor heat exchangers 56, and thus, a plurality of indoor units I, and a plurality of individual expansion devices 59, a single heat exchanger 56, and thus, a single indoor unit I, and a single expansion device 59 may be used. For simplicity of description, the following description will be given only in conjunction with the case in which a plurality of indoor heat exchangers 56, and thus, a plurality of indoor units I, and a plurality of individual expansion devices 59 are used.

The generator 110 may be an AC generator or a DC generator. The generator 110 includes a rotor coupled to an output shaft of the drive source 120 so that the generator 110 generates electricity during rotation of the output shaft.

The generator 110 is coupled to the heat pump type air conditioner 50 via a power line 111, so as to supply the generated electricity to the heat pump type air conditioner 50 via the power line 111.

The drive source 120 comprises a fuel cell or an engine, which operates using fuel such as liquefied gas or liquefied petroleum gas. For simplicity of description, the following description will be given only in conjunction with the case in which the drive source 120 comprises an engine.

A fuel supply tube 121, an air supply tube 122, and an exhaust tube 123 are connected to the engine 120. The fuel supply tube 13 is adapted to supply fuel such as liquefied gas or liquefied petroleum gas to the engine 120. The air supply tube 122 is joined to the fuel supply tube 121 to supply air to the engine 120. The exhaust tube 123 is adapted to discharge exhaust gas generated from the engine 120.

The waste heat recoverer 130 includes a cooling water heat exchanger 132 connected to the engine 120 via a cooling water line 124 to recover heat of cooling water used to cool the engine 120, a first exhaust gas heat exchanger 134 arranged at the exhaust tube 123 to recover waste heat of exhaust gas discharged from the engine 120, and a second exhaust gas heat exchanger 136 arranged at the exhaust tube 123 to recover the residual waste heat of the exhaust gas, which has released waste heat to the first exhaust gas heat exchanger 134.

A cooling water circulation pump 125 is arranged at the engine 120 or cooling water line 124 to cause the cooling water to be circulated through the engine 120 and cooling water heat exchanger 132.

The cooling water heat exchanger 132, first exhaust gas heat exchanger 134, and second exhaust gas heat exchanger 136 are connected to the waste heat supplying heat exchangers 140 via a heat transfer line 141 to transfer the recovered waste heat to the waste heat supplying heat exchangers 140.

The heat transfer unit 141 includes a heat medium circulation conduit 142 to guide the heat medium to be circulated through the cooling water heat exchanger 132, second exhaust gas heat exchanger 136, first exhaust gas heat exchanger 134, and waste heat supplying heat exchangers 140, in this order, and a heat medium circulation pump 143 arranged at the heat medium circulation conduit 142 to pump the heat medium for the circulation of the heat medium.

The cogeneration system further includes a radiating heat exchanger 144 to radiate the waste heat recovered by the waste heat recoverer 130.

The radiating heat exchanger 144 is connected with the heat medium circulation conduit 142 via a radiating bypass conduit 145, so that the heat medium passing through the heat medium circulation conduit 142 bypasses the waste heat supplying heat exchangers 140, and passes through the radiating heat exchanger 144.

The cogeneration system further includes a waste heat distributor 146 to distribute the heat recovered by the waste heat recoverer 130 to the waste heat supplying heat exchangers 140 and radiating heat exchanger 144.

The waste heat distributor 146 comprises a 3-way valve that is arranged at a portion of the heat medium circulation conduit 142, from which the radiating bypass circuit 145 is branched.

The cogeneration system may be configured such that the heat of the radiating heat exchanger 144 is used in a water heating tank 147 or a thermal storage tank (not shown) or is radiated to the atmosphere.

Where the cogeneration system is configured such that the heat of the radiating heat exchanger 144 is used in the water heating tank 147 or thermal storage tank, the radiating heat exchanger 144 is partially or entirely arranged in the water heating tank 147 or thermal storage tank.

On the other hand, where the cogeneration system is configured such that the heat of the radiating heat exchanger 144 is radiated to the atmosphere, a radiating fan 148 is arranged near the radiating heat exchanger 144 to blow outdoor air to the radiating heat exchanger 144.

Although the cogeneration system includes a plurality of waste heat supplying heat exchangers 140, a single waste heat supplying heat exchanger 140 may be used. Also, the waste heat supplying heat exchangers 140 may be connected in series or in parallel. For simplicity of description, the following description will be given only in conjunction with the case in which a plurality of waste heat supplying heat exchangers 140 connected in parallel are used.

The cogeneration system further includes a chassis 149, in which an engine room E is defined to receive the generator 110, engine 120, waste heat recoverer 130, and waste heat supplying heat exchangers 140 are disposed.

The bypassing unit 150 includes an outdoor heat exchanger bypass conduit 152 to guide the refrigerant, which is expanded while passing through the expansion devices 58 and 59 during the heating operation of the heat pump type air conditioner 50, to bypass the outdoor heat exchangers 60, waste heat supplying heat exchanger connecting conduits 160 and 162 to guide the refrigerant, which passes through the outdoor heat exchanger bypass conduit 152 while bypassing the outdoor heat exchangers 60 during the cooling operation of the heat pump type air conditioner 50, to be introduced into the 4-way valve 54 after passing through the waste heat supplying heat exchangers 140, and a waste heat supplying heat exchanger bypass conduit 170 to guide the refrigerant, which passes through the 4-way valve 54 during the cooling operation of the heat pump type air conditioner 50, to bypass the waste heat supplying heat exchanger 140.

The outdoor heat exchanger bypass conduit 152 is arranged in the heat pump type air conditioner 50, in particular, the outdoor unit O.

The waste heat supplying heat exchanger bypass conduit 170 is arranged in the interior of the chassis 149.

The bypassing unit 150 further includes a first heating operation control valve 154 arranged at the outdoor heat exchanger bypass conduit 152, second heating operation control valves 164 and 166 respectively arranged at the waste heat supplying heat exchanger connecting conduits 160 and 162, a first cooling operation control valve 157 arranged between a branching point or inlet 152a of the outdoor heat exchanger bypass conduit 152 and the outdoor heat exchangers 60, a second cooling operation control valve 158 arranged between a joining point or outlet 152b of the outdoor heat exchanger bypass conduit 152 and the outdoor heat exchangers 60, and a third cooling operation control valve 172 arranged at the waste heat supplying heat exchanger bypass conduit 170.

The first heating operation control valve 154 comprises an ON/OFF valve arranged in the heat pump type air conditioner 50, in particular, the outdoor unit O, to open the outdoor heat exchanger bypass conduit 152 during the heating operation of the heat pump type air conditioner 50, and to close the outdoor heat exchanger bypass conduit 152 during the cooling operation of the heat pump type air conditioner 50.

The second heating operation control valves 164 and 166 are arranged between a branching point or inlet 170a of the waste heat supplying heat exchanger bypass conduit 170 and the waste heat supplying heat exchangers 140, and between a joining point or outlet 170b of the waste heat supplying heat exchanger bypass conduit 170 and the waste heat supplying heat exchangers 140, respectively.

The second heating operation control valves 164 and 166 comprise ON/OFF valves arranged in the interior of the chassis 148 to open the waste heat supplying heat exchanger connecting conduits 160 and 162 during the heating operation of the heat pump type air conditioner 50, and to close the refrigerant path defined between the branching point 170a of the waste heat supplying heat exchanger bypass conduit 170 and the waste heat supplying heat exchangers 140 and between the refrigerant path defined between the joining point 170b of the waste heat supplying heat exchanger bypass conduit 170 and the waste heat supplying heat exchangers 140 during the cooling operation of the heat pump type air conditioner 50, respectively, and thus, to prevent the refrigerant from being introduced into the waste heat supplying heat exchanger 140.

The first cooling operation control valve 157 comprises an ON/OFF valve arranged in the heat pump type air conditioner 50, in particular, the outdoor unit O, to prevent the refrigerant, which is expanded in the expansion device 58 during the heating operation of the heat pump type air conditioner 50, from being introduced into the outdoor heat exchangers 60, and to guide the refrigerant, which passes through the outdoor heat exchangers 60 during the cooling operation of the heat pump type air conditioner 50, to be introduced into the expansion device 58.

The second cooling operation control valve 158 comprises an ON/OFF valve arranged in the heat pump type air conditioner 50, in particular, the outdoor unit O, to prevent the refrigerant, which passes through the outdoor heat exchanger bypass conduit 150 during the heating operation of the heat pump type air conditioner 50, from flowing backward to the outdoor heat exchanger 60, and to guide the refrigerant, which flows to the heat pump type air conditioner 50 after bypassing the waste heat supplying heat exchanger 140 during the cooling operation of the heat pump type air conditioner 50, to be introduced into the outdoor heat exchanger 60.

The third cooling operation control valve 172 comprises an ON/OFF valve arranged in the interior of the chassis 148 to close the waste heat supplying heat exchanger bypass conduit 170 during the heating operation of the heat pump type air conditioner 50, and to open the waste heat supplying heat exchanger bypass conduit 170 during the cooling operation of the heat pump type air conditioner 50.

Hereinafter, operation of the cogeneration system having the above-described arrangement will be described.

When the engine 120 is driven, the rotor of the generator 110 is rotated, thereby generating electricity. The electricity is supplied to the heat pump type air conditioner 50 and other devices via the power line 111, as shown in FIGS. 2 and 3.

During the operation of the engine 120, waste heat of the exhaust gas of the engine 120 and waste heat of the cooling water of the engine 120 are recovered by the exhaust gas heat exchangers 134 and 136, and the cooling water heat exchanger 132, respectively.

During the heating operation of the heat pump type air conditioner 50, the heat medium circulation pump 143 is driven, and the 3-way valve 146 performs a flow path switching operation to cause the heat medium to flow to the waste heat supplying heat exchangers 140.

The heat medium in the heat transfer line 142 is pumped by the heat medium circulation pump 143, so that the heat medium is circulated through the cooling water heat exchanger 132, second exhaust gas heat exchanger 136, first exhaust gas heat exchanger 134, and waste heat supplying heat exchangers 140, in this order, as shown in FIG. 2. In this case, heat is transferred from the cooling water heat exchanger 132 and first and second exhaust gas heat exchangers 134 and 136 to the waste heat supplying heat exchangers 140, so that the waste heat supplying heat exchangers 140 are heated.

On the other hand, during the heating operation of the heat pump type air conditioner 50, the heat medium circulation pump 143 is driven, and the 3-way valve 146 performs a flow path switching operation to cause the heat medium to flow to the radiating heat exchanger 144. In this case, the radiating fan 148 is also rotated.

As shown in FIG. 3, the heat medium in the heat transfer line 142 is pumped by the heat medium circulation pump 143, so that the heat medium is circulated through the cooling water heat exchanger 132, second exhaust gas heat exchanger 136, first exhaust gas heat exchanger 134, and waste heat supplying heat exchanger 140, in this order. In this case, heat is transferred from the cooling water heat exchanger 132 and first and second exhaust gas heat exchangers 134 and 136 to the radiating heat exchanger 144 which, in turn, radiates the heat to the atmosphere. The heat may be transferred to the water heating tank 147 or thermal storage tank.

Thus, the waste heat of the engine 120 is used to heat the waste heat supplying heat exchangers 140 during the heating operation of the heat pump type air conditioner 50, and is discharged to the atmosphere, is used in the water heating tank 147 or is stored in the thermal storage tank during the cooling operation of the heat pump type air conditioner 50.

Meanwhile, when the heat pump type air conditioner 50 operates in the heating mode, the compressors 52 are driven, and the 4-way valve 54 is switched to a heating mode. Also, the first and second heating operation control valves 154, 164, and 166 are opened, and the first through third cooling operation control valves 157, 158, and 172 are closed.

The refrigerant compressed in the compressors 52 is introduced into the indoor heat exchanger 56 after passing through the 4-way valve 54. The refrigerant releases heat into indoor air while passing through the indoor heat exchanger 56, so that the refrigerant is condensed. Thereafter, the refrigerant is expanded while passing through the expansion devices 58 and 59.

The expanded refrigerant passes through the outdoor heat exchanger bypass conduit 152 without being introduced into the outdoor heat exchangers 60 in accordance with a blocking function of the first cooling operation control valve 157. The refrigerant then passes through the waste heat supplying heat exchanger connecting conduit 160 without flowing backward toward the outdoor heat exchangers 60 in accordance with a blocking function of the second cooling operation control valve 158.

Subsequently, the refrigerant is fed to the engine room E of the chassis 149 via the waste heat supplying heat exchanger connecting conduit 160. The refrigerant is then introduced into the waste heat supplying heat exchangers 140 without bypassing the waste heat supplying heat exchanger bypass conduit 170 in accordance with a blocking function of the third cooling operation control valve 172. Accordingly, the refrigerant is evaporated by receiving heat from the waste heat supplying heat exchangers 140.

The evaporated refrigerant is again fed to the heat pump type air conditioner 50 via the waste heat supplying heat exchanger connecting conduit 162 without flowing backward to the waste heat supplying heat exchanger bypass conduit 170 in accordance with the blocking function of the third cooling operation control valve 172. The refrigerant is then sucked into the compressors 52 after passing through the 4-way valve 54.

The refrigerant sucked into the compressors 52 repeats the above-described circulation, thereby causing the indoor heat exchangers 56 to function as heaters. In this case, the heat pump type air conditioner 50 can provide a constant heating capacity irrespective of a variation in outdoor temperature because the refrigerant is not evaporated in the outdoor heat exchangers 60, but is evaporated in the waste heat supplying heat exchangers 140.

On the other hand, when the heat pump type air conditioner 50 operates in the cooling mode, the compressors 52 are driven, and the 4-way valve 54 is switched to a cooling mode. Also, the outdoor fan 61 is rotated, the outdoor heat exchanger bypass valve 154 is closed, the first heating operation control valve 154 and second heating operation control valves 164 and 166 are closed, and the first through third cooling operation control valves 157, 158, and 172 are opened.

The refrigerant compressed in the compressors 52 is introduced into the waste heat supplying heat exchanger connecting conduit 162 after passing through the 4-way valve 54. The refrigerant is then fed to the engine room E of the chassis 149 via the waste heat supplying heat exchanger connecting conduit 162. The refrigerant then passes through the waste heat supplying heat exchanger bypass conduit 170 without being introduced into the waste heat supplying heat exchangers 140 in accordance with blocking functions of the second heating operation control valves 164 and 166.

The refrigerant emerging from the waste heat supplying heat exchanger bypass conduit 170 is again fed to the heat pump type air conditioner 50 via the waste heat supplying heat exchanger connecting conduit 160 without flowing backward to the waste heat supplying heat exchangers 140 in accordance with the blocking functions of the second heating operation control valves 164 and 166.

The refrigerant fed to the heat pump type air conditioner 50 is introduced into the outdoor heat exchangers 60 without bypassing the outdoor heat exchanger bypass conduit 152 in accordance with a blocking function of the first heating operation control valve 154.

The refrigerant introduced into the outdoor heat exchangers 60 exchanges heat with air blown by the outdoor fan 61, so that the refrigerant is condensed. The condensed refrigerant is then expanded by the expansion devices 58 and 59 without flowing backward to the outdoor heat exchanger bypass conduit 152.

The refrigerant expanded by the expansion devices 58 and 59 exchanges heat with the indoor heat exchangers 58 while passing through the indoor heat exchangers 58, so that the refrigerant is evaporated. Thereafter, the refrigerant is sucked into the compressors 52 via the 4-way valve 54.

The refrigerant sucked into the compressors 52 repeats the above-described circulation, thereby causing the indoor heat exchangers 56 to function as coolers.

Figure 4:
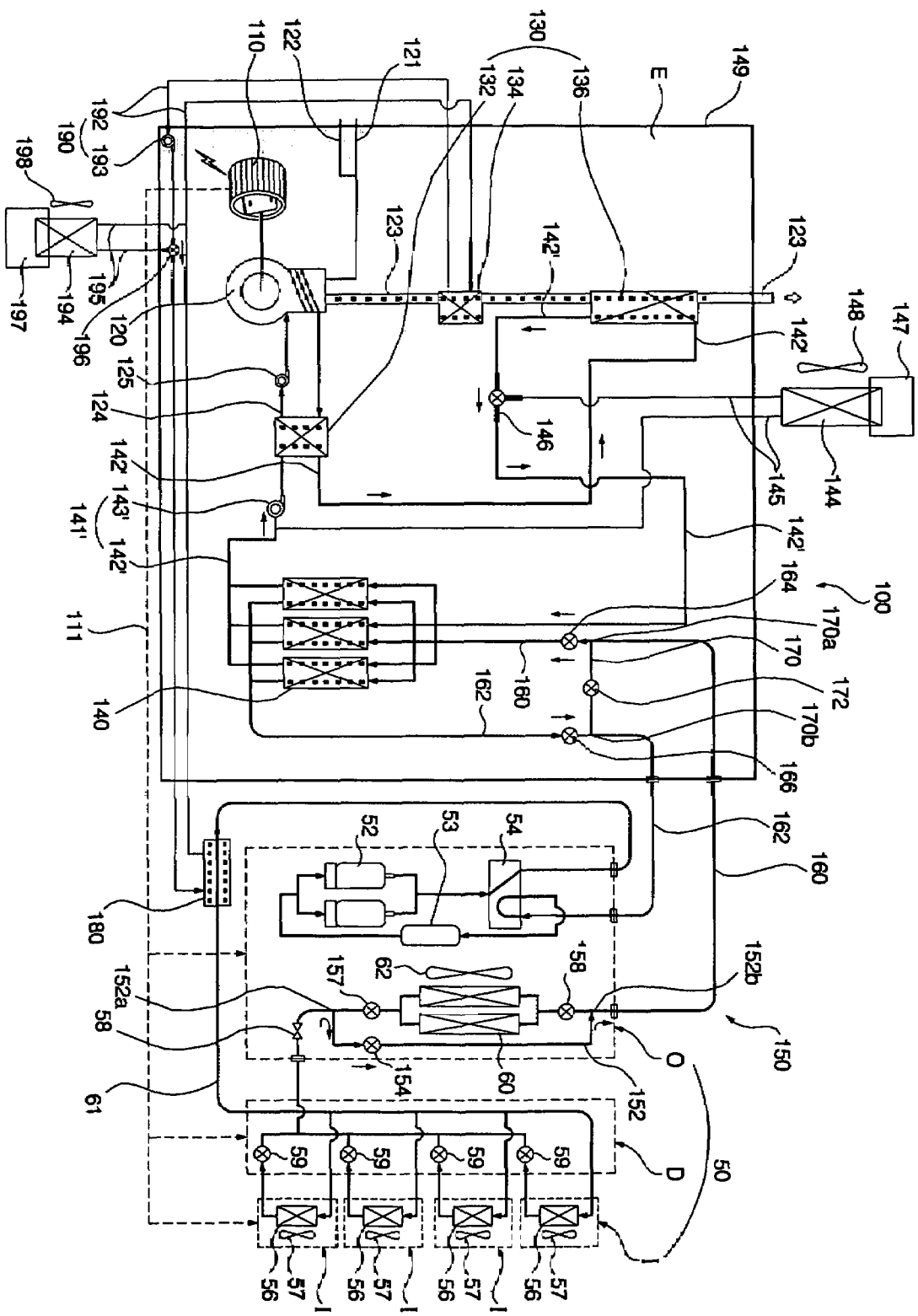
FIG. 4 is a schematic diagram of a cogeneration system according to a second embodiment of the present invention, illustrating a heat medium flow and a refrigerant flow generated during a heating operation of a heat pump type air conditioner included in the cogeneration system.
Figure 5:
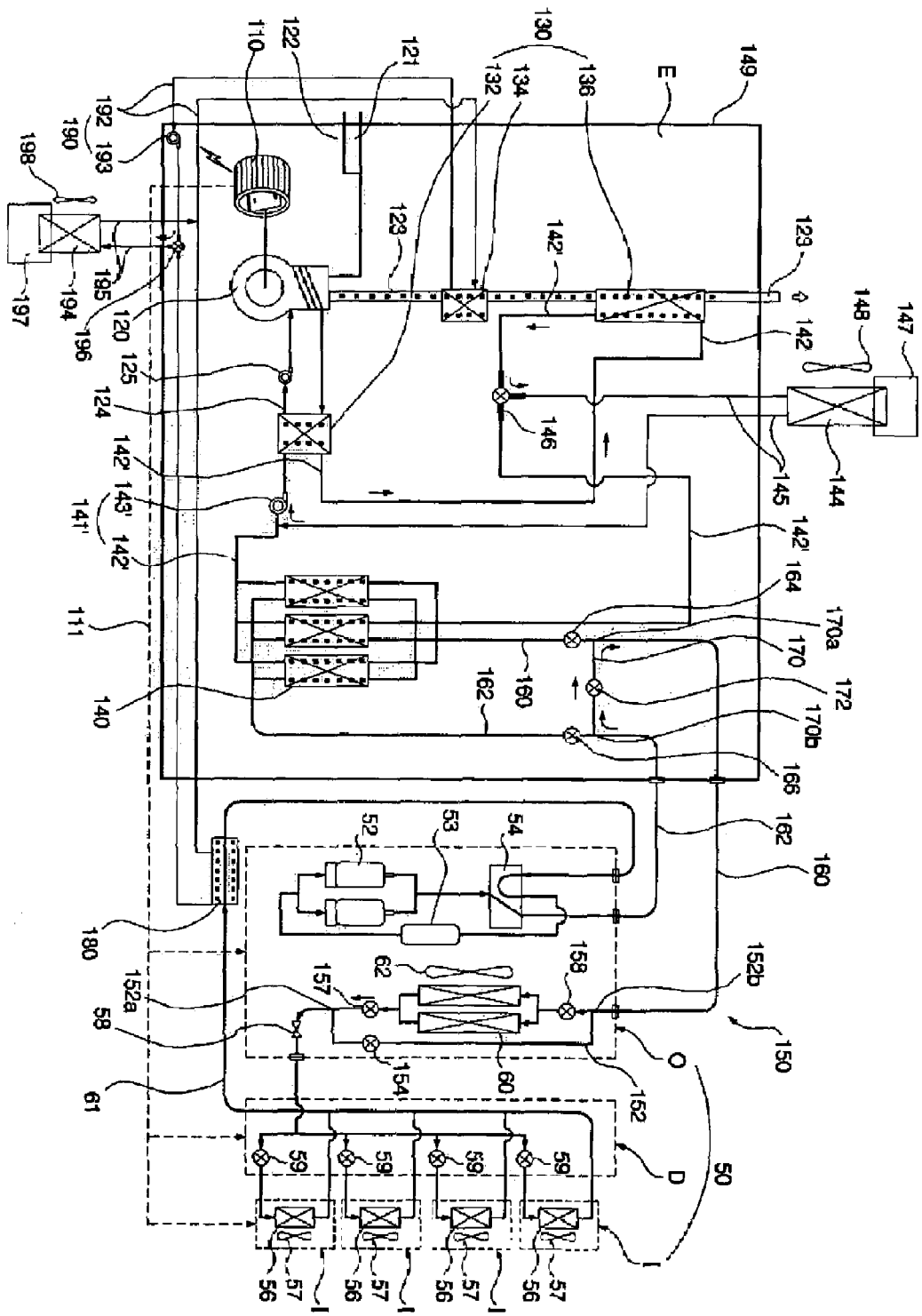
FIG. 5 is a schematic diagram of the cogeneration system according to the second embodiment of the present invention, illustrating a heat medium flow and a refrigerant flow generated during a cooling operation of the heat pump type air conditioner.

FIG. 4 is a schematic diagram of a cogeneration system according to a second embodiment of the present invention, illustrating a heat medium flow and a refrigerant flow generated during a heating operation of a heat pump type air conditioner included in the cogeneration system. FIG. 5 is a schematic diagram of the cogeneration system according to the second embodiment of the present invention, illustrating a heat medium flow and a refrigerant flow generated during a cooling operation of the heat pump type air conditioner.

As shown in FIGS. 4 and 5, the cogeneration system according to this embodiment includes, in addition to the configuration of the first embodiment, a heat transfer unit 141' to transfer heat of at least one of the cooling water heat exchanger 132, first exhaust gas heat exchanger 134, and second exhaust gas heat exchanger 136, for example, heat of the cooling water heat exchanger 132 and second exhaust gas heat exchanger 136, to the waste heat supplying heat exchanger 140, a second waste heat supplying heat exchanger 180 to heat the refrigerant compressed in the compressors 52 during the heating operation of the heat pump type air conditioner 50, and a second heat transfer unit 190 to transfer heat of the remaining one or ones of the cooling water heat exchanger 132, first exhaust gas heat exchanger 134, and second exhaust gas heat exchanger 136, for example, the first exhaust gas heat exchanger 134, to the second waste heat supplying heat exchanger 180. The cogeneration system of the second embodiment has the same configuration and functions as those of the first embodiment, except for the heat transfer unit 141', second waste heat supplying heat exchanger 180, and second heat transfer unit 190. Accordingly, the constituent elements of the second embodiment respectively corresponding to those of the first embodiment are designated by the same reference numerals, and no detailed description thereof will be given.

For simplicity of description, the following description will be given only in conjunction with the case in which the heat transfer unit 141' transfers the heat of the cooling water heat exchanger 132 and second exhaust gas heat exchanger 136 to the waste heat supplying heat exchanger 140, and the second heat transfer unit 190 transfers the heat of the first exhaust gas heat exchanger 134 to the second waste heat supplying heat exchanger 140.

The heat transfer unit 141' includes a heat medium circulation conduit 142' to guide the heat medium to be circulated through the cooling water heat exchanger 132, second exhaust gas heat exchanger 136, and waste heat supplying heat exchangers 140, in this order, and a heat medium circulation pump 143' arranged at the heat medium circulation conduit 142' to pump the heat medium for the circulation of the heat medium.

Although the cogeneration system includes a single second waste heat supplying heat exchanger 180, a plurality of second waste heat supplying heat exchangers 180 may be used. In this case, the waste heat supplying heat exchangers 140 may be connected in series or in parallel. For simplicity of description, the following description will be given only in conjunction with the case in which a single second waste heat supplying heat exchanger 180 is used.

The second heat transfer unit 190 includes a second heat medium circulation conduit 192 to guide the heat medium to be circulated through the first exhaust gas heat exchanger 134 and second waste heat supplying heat exchanger 180, and a heat medium circulation pump 193 arranged at the second heat medium circulation conduit 192 to pump the heat medium for the circulation of the heat medium.

The cogeneration system further includes a second radiating heat exchanger 194 to radiate the heat recovered by the first exhaust gas heat exchanger 134.

The second radiating heat exchanger 194 is connected with the second heat medium circulation conduit 192 via a second radiating bypass conduit 195, so that the heat medium passing through the second heat medium circulation conduit 192 bypasses the second waste heat supplying heat exchangers 180, and passes through the second radiating heat exchanger 194.

The cogeneration system further includes a second waste heat distributor 196 to distribute the heat recovered by the first exhaust gas heat exchanger 134 to the second waste heat supplying heat exchangers 180 and second radiating heat exchanger 194.

The second waste heat distributor 196 comprises a second 3-way valve that is arranged at a portion of the second heat medium circulation conduit 192, from which the second radiating bypass circuit 195 is branched.

The cogeneration system may be configured such that the heat of the second radiating heat exchanger 194 is used in a second water heating tank 197 or a second thermal storage tank (not shown) or is radiated to the atmosphere.

Where the cogeneration system is configured such that the heat of the second radiating heat exchanger 194 is used in the second water heating tank 197 or thermal storage tank, the second radiating heat exchanger 194 is partially or entirely arranged in the second water heating tank 197 or thermal storage tank.

On the other hand, where the cogeneration system is configured such that the heat of the second radiating heat exchanger 194 is radiated to the atmosphere, a second radiating fan 198 is arranged near the second radiating heat exchanger 194 to blow outdoor air to the second radiating heat exchanger 194.

In the cogeneration system according to this embodiment, during the heating operation of the heat pump type air conditioner 50, the waste heat recovered by the cooling water heat exchanger 132 and second exhaust gas heat exchanger 136 is transferred to the waste heat supplying heat exchanger 140, so that the waste heat supplying heat exchanger 140 functions as an evaporator of the heat pump type air conditioner 50. Accordingly, the heating performance of the heat pump type air conditioner 50 is enhanced irrespective of outdoor temperature. Also, the waste heat recovered by the first exhaust gas heat exchanger 134 is transferred to the second waste heat supplying heat exchanger 180 which, in turn, heats the refrigerant compressed by the compressors 52. The refrigerant heated by the second waste heat supplying heat exchanger 180 is introduced into the indoor heat exchanger 56. Accordingly, the heating performance of the heat pump type air conditioner 50 is enhanced.

On the other hand, during the cooling operation of the heat pump type air conditioner 50, the waste heat recovered by the cooling water heat exchanger 132 and second exhaust gas heat exchanger 136 is radiated from the radiating heat exchanger 144 or is used in the water heating tank 147 or thermal storage tank. Also, the waste heat recovered by the first exhaust gas heat exchanger 134 is radiated from the second radiating heat exchanger 197 or is used in the water heating tank 197 or second thermal storage tank.

Figure 6:
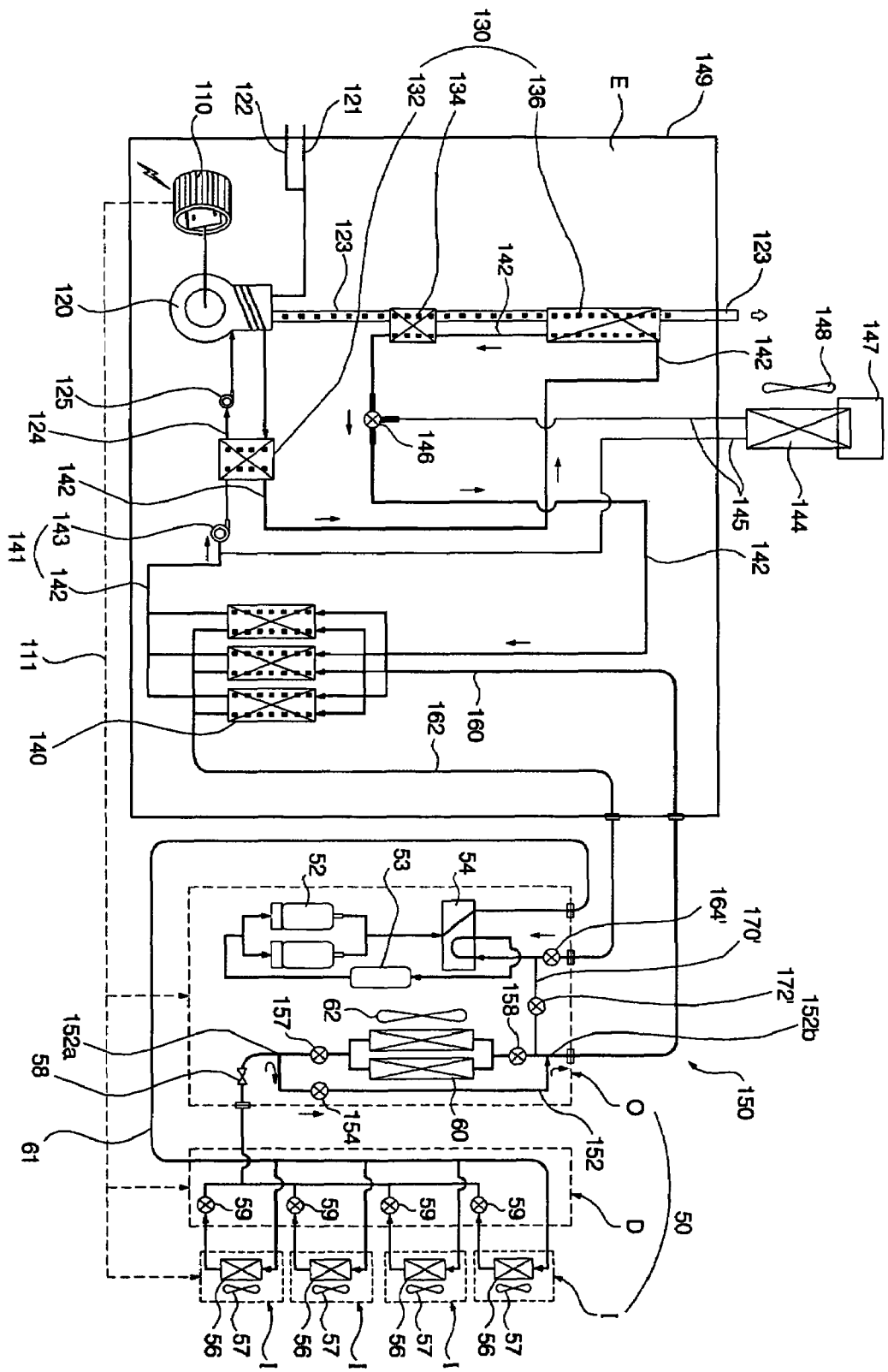
FIG. 6 is a schematic diagram of a cogeneration system according to a third embodiment of the present invention, illustrating a heat medium flow and a refrigerant flow generated during a heating operation of a heat pump type air conditioner included in the cogeneration system.
Figure 7:
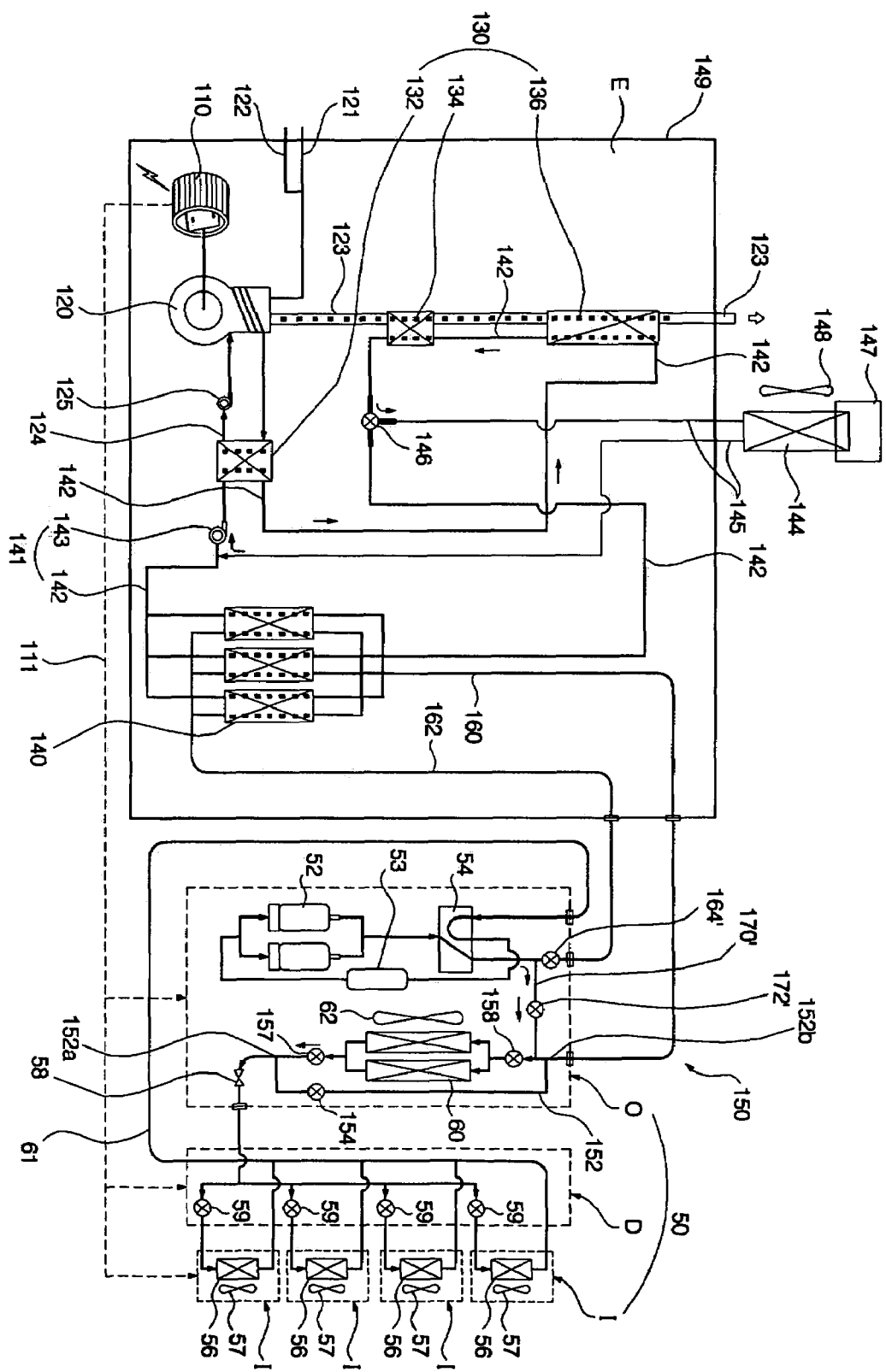
FIG. 7 is a schematic diagram of the cogeneration system according to the third embodiment of the present invention, illustrating a heat medium flow and a refrigerant flow generated during a cooling operation of the heat pump type air conditioner.

FIG. 6 is a schematic diagram of a cogeneration system according to a third embodiment of the present invention, illustrating a heat medium flow and a refrigerant flow generated during a heating operation of a heat pump type air conditioner included in the cogeneration system. FIG. 7 is a schematic diagram of the cogeneration system according to the third embodiment of the present invention, illustrating a heat medium flow and a refrigerant flow generated during a cooling operation of the heat pump type air conditioner.

As shown in FIGS. 6 and 7, the cogeneration system according to this embodiment has the same configuration and functions as those of the first and second embodiments, except that all the outdoor heat exchanger bypass conduit 152, waste heat supplying heat exchanger bypass conduit 170', first and second heating operation control valves 154 and 164', and first through third cooling operation control valves 157, 158, and 172' are arranged in the heat pump type air conditioner 50. Accordingly, the constituent elements of the third embodiment respectively corresponding to those of the first and second embodiments are designated by the same reference numerals, and no detailed description thereof will be given.

Figure 8:
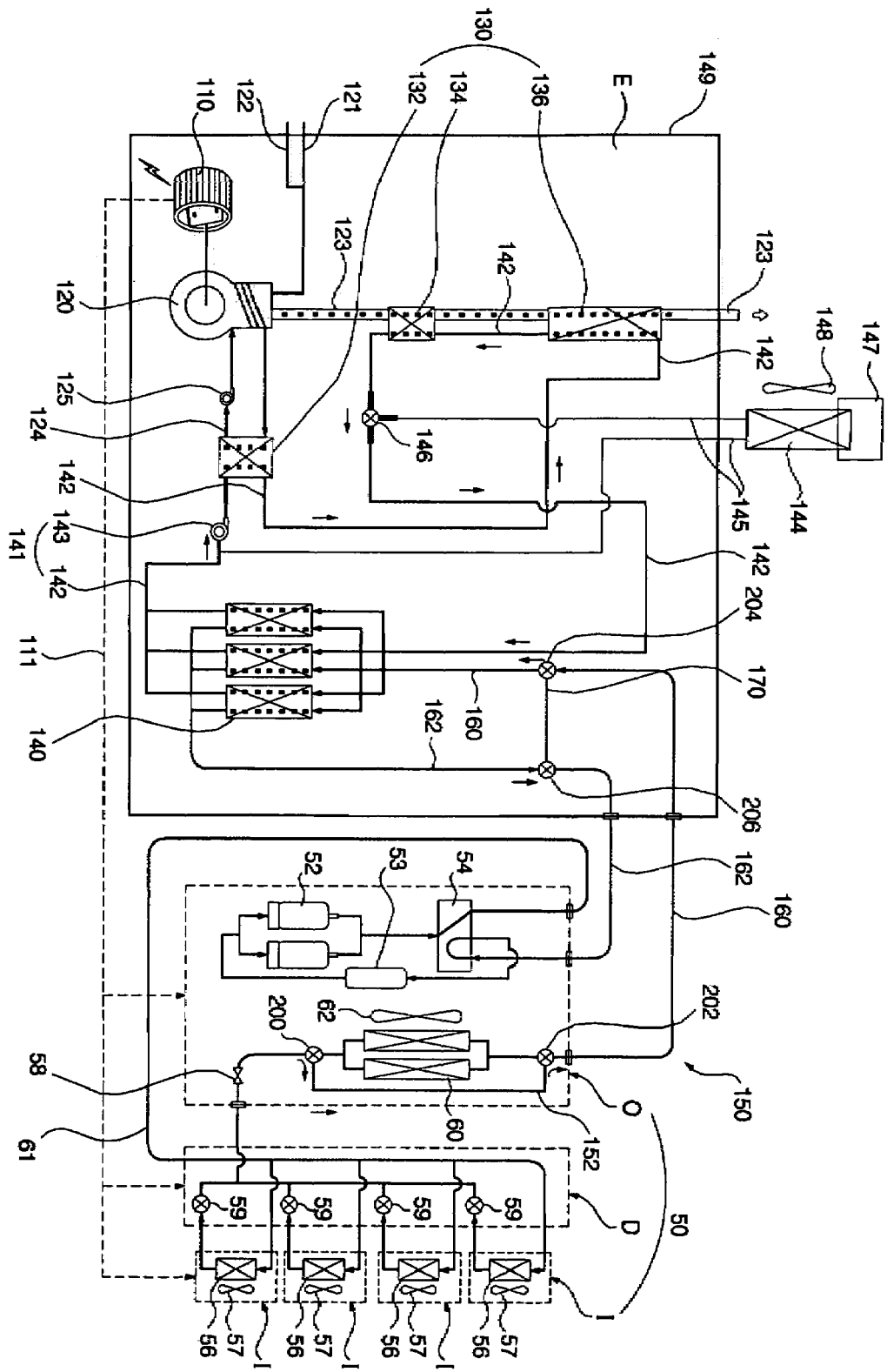
FIG. 8 is a schematic diagram of a cogeneration system according to a fourth embodiment of the present invention, illustrating a heat medium flow and a refrigerant flow generated during a heating operation of a heat pump type air conditioner included in the cogeneration system.
Figure 9:
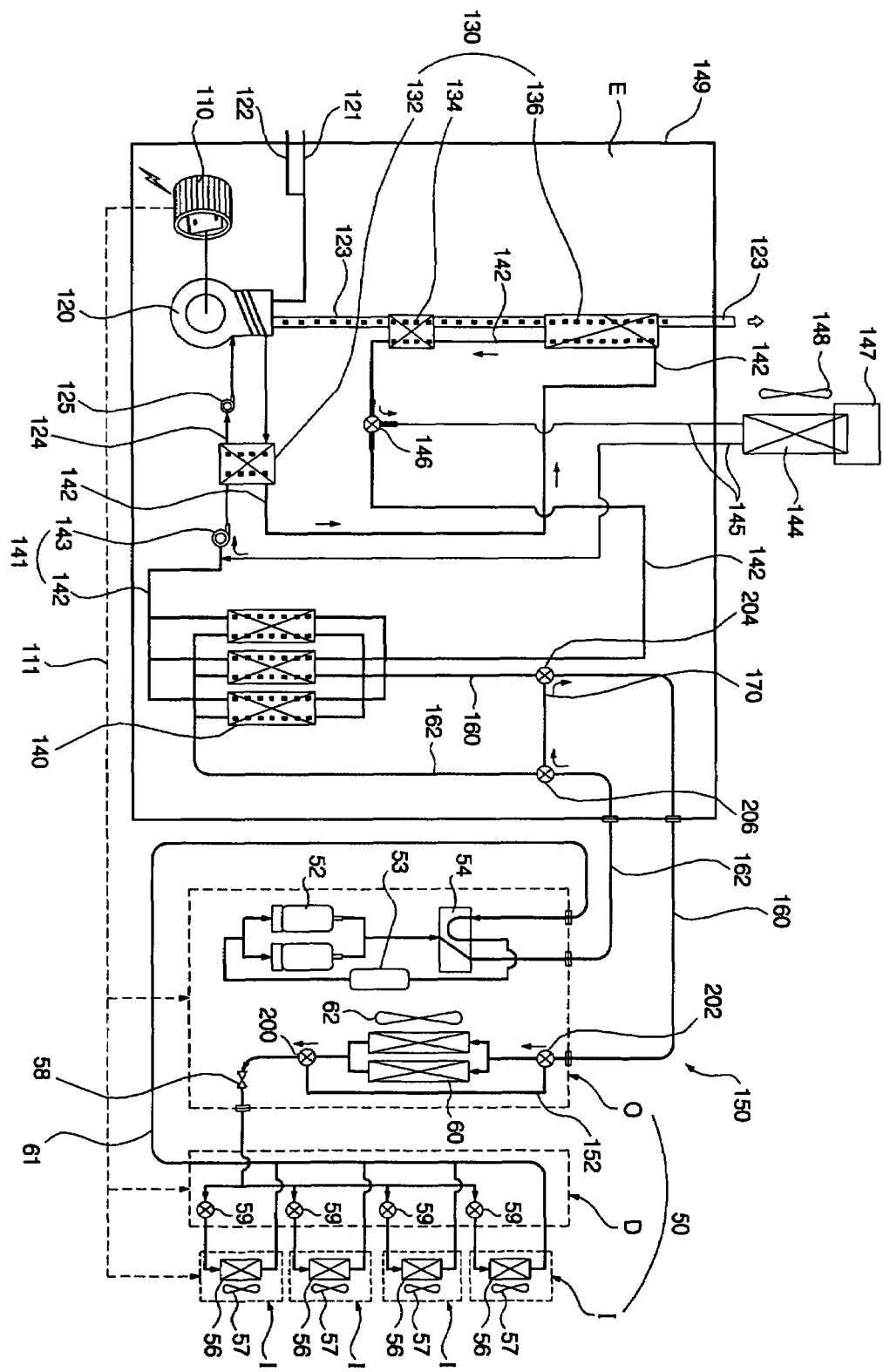
FIG. 9 is a schematic diagram of the cogeneration system according to the fourth embodiment of the present invention, illustrating a heat medium flow and a refrigerant flow generated during a cooling operation of the heat pump type air conditioner.

FIG. 8 is a schematic diagram of a cogeneration system according to a fourth embodiment of the present invention, illustrating a heat medium flow and a refrigerant flow generated during a heating operation of a heat pump type air conditioner included in the cogeneration system. FIG. 9 is a schematic diagram of the cogeneration system according to the fourth embodiment of the present invention, illustrating a heat medium flow and a refrigerant flow generated during a cooling operation of the heat pump type air conditioner.

As shown in FIGS. 8 and 9, the bypassing unit 150 of the cogeneration system according to this embodiment includes, in addition to the first and second heat operation control valves 154, 164 and 166 used in the first embodiment, first and second 3-way valves 200 and 202 respectively arranged at the branching and joining points 152a and 152b of the outdoor heat exchanger bypass conduit 152, and third and fourth 3-way valves 204 and 206 respectively arranged at the branching and joining points 170a and 170b of the waste heat supplying heat exchanger bypass conduit 170. The cogeneration system according to this embodiment has the same configuration and functions as those of the first and second embodiments, except for the first and second 3-way valves 200 and 202, and the third and fourth 3-way valves 204 and 206. Accordingly, the constituent elements of the fourth embodiment respectively corresponding to those of the first and second embodiments are designated by the same reference numerals, and no detailed description thereof will be given.

The cogeneration system according to any one of the above-described embodiments of the present invention has various effects.

That is, first, the cogeneration system according to the present invention have advantages in that it is possible to enhance the heating capacity of the heat pump type air conditioner irrespective of outdoor temperature, and to prevent damage of the compressors because the cogeneration system includes the waste heat recoverer to recover the waste heat of the drive source to drive the generator, the waste heat supplying heat exchanger, which is heated by the waste heat recovered by the waste heat recoverer, and the bypassing unit, which causes the waste heat supplying heat exchanger to function as an evaporator during the heating operation of the heat pump type air conditioner.

Second, the cogeneration system according to the present invention has advantages in that it is possible to re-use waste heat only for required purposes, and to cope with an overload of the heat pump type air conditioner because the cogeneration system includes the radiating heat exchanger to radiate the heat recovered by the waste heat recoverer, and a waste heat distributor to distribute the heat recovered by the waste heat recoverer to the waste heat supplying heat exchanger and radiating heat exchanger.

Third, the cogeneration system according to the present invention has advantages in that it is possible to use the waste heat of the engine not only in the heat pump type air conditioner, but also in the water heating tank or thermal storage tank because the radiating heat exchanger is partially or entirely arranged in at least one of the water heating tank and thermal storage tank.

Fourth, the cogeneration system according to the present invention has advantages in that it is possible to enhance the heating performance of the heat pump type air conditioner to the maximum, and to minimize the power consumption required to drive the compressors, correspondingly to the heating performance enhancement, because the waste heat of the engine is partially transferred to the waste heat supplying heat exchanger, and the remaining portion of the waste heat is transferred to the second waste heat supplying heat exchanger adapted to heat the refrigerant compressed in the compressors, so that the refrigerant is supplied to the indoor heat exchangers after being heated by the second waste heat supplying heat exchanger.

Fifth, the cogeneration system according to the present invention has an advantage in that it is possible to bypass the refrigerant, using a simple arrangement, because the bypassing unit includes the outdoor heat exchanger bypass conduit, waste heat supplying heat exchanger connecting conduits, waste heat supplying heat exchanger bypass conduit, first and second heating operation control valves, and first through third cooling operation control valves.

Sixth, the cogeneration system according to the present invention has an advantage in that it is possible to bypass the refrigerant, using a minimal number of valves, because the bypassing unit includes the outdoor heat exchanger bypass conduit, waste heat supplying heat exchanger connecting conduits, waste heat supplying heat exchanger bypass conduit, and first through fourth 3-way valves.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cogeneration system comprising:
   a heat pump type air conditioner including a compressor, a 4-way valve, an indoor heat exchanger, expansion devices, and an outdoor heat exchanger;
   a generator to generate electricity;
   a drive source, which operates to drive the generator, and generates waste heat during the operation of the drive source;
   a waste heat recoverer to recover the waste heat of the drive source;
   a waste heat supplying heat exchanger, which is heated by the waste heat recovered by the waste heat recoverer; and
   a bypassing unit to guide a refrigerant such that the refrigerant, which is expanded while passing though the expansion devices, during a heating operation of the heat pump type air conditioner, bypasses the outdoor heat exchanger, and enters the 4-way valve after being evaporated in the waste heat supplying heat exchanger, and such that the refrigerant, which is compressed in the compressor during a cooling operation of the heat pump type air conditioner, bypasses the waste heat supplying heat exchanger, and passes through the outdoor heat exchanger while being condensed in the outdoor heat exchanger;
   a radiating heat exchanger to radiate the waste heat recovered by the waste heat recoverer;
   a heat medium circulation conduit, which connects the waste heat recoverer and the waste heat supplying heat exchanger, and through which a heat medium is circulated;
   a radiating bypass conduit, which connects the radiating heat exchanger and the heat medium circulation conduit, and guides the heat medium passing through the heat medium circulation conduit to bypass the waste heat supplying heat exchanger; and
   a waste heat distributor to distribute the waste heat recovered by the waste heat recoverer to the waste heat supplying heat exchanger and the radiating heat exchanger, said waste heat distributor comprising a 3-way valve arranged at an inlet of the radiating bypass conduit.

2. The cogeneration system according to claim 1, wherein the radiating heat exchanger is partially or entirely arranged in at least one of a water heating tank and a heat storage tank.

3. The cogeneration system according to claim 1, wherein the waste heat supplying heat exchanger comprises a plurality of ones, which are connected in series or in parallel.

4. The cogeneration system according to claim 1, wherein the heat pump type air conditioner is coupled with the generator so that the heat pump type air conditioner is driven with the electricity generated from the generator.

5. A cogeneration system comprising:
   a heat pump type air conditioner including a compressor, a 4-way valve, an indoor heat exchanger, expansion devices, and an outdoor heat exchanger;
   a generator to generate electricity;
   a drive source, which operates to drive the generator, and generates waste heat during the operation of the drive source;
   a waste heat recoverer to recover the waste heat of the drive source;
   a waste heat supplying heat exchanger, which is heated by the waste heat recovered by the waste heat recoverer; and
   a bypassing unit to guide a refrigerant such that the refrigerant, which is expanded while passing through the expansion devices, during a heating operation of the heat pump type air conditioner, bypasses the outdoor heat exchanger, and enters the 4-way valve after being evaporated in the waste heat supplying heat exchanger, and such that the refrigerant, which is compressed in the compressor during a cooling operation of the heat pump type air conditioner, bypasses the waste heat supplying heat exchanger, and passes through the outdoor heat exchanger while being condensed in the outdoor heat exchanger,
   wherein the waste heat recoverer comprises:
   a cooling water heat exchanger to recover waste heat of cooling water used to cool the drive source;
   a first exhaust gas heat exchanger to recover waste heat of exhaust gas generated from the drive source; and
   a second exhaust gas heat exchanger to recover the waste heat of the exhaust gas remaining after being absorbed in the first exhaust gas heat exchanger.

6. The cogeneration system according to claim 5, further comprising:
   a heat transfer unit to transfer heat from the cooling water heat exchanger, the first exhaust gas heat exchanger, and the second exhaust gas heat exchanger to the waste heat supplying heat exchanger.

7. The cogeneration system according to claim 5, further comprising:
   a heat transfer unit to transfer heat from at least one of the cooling water heat exchanger, the first exhaust gas heat exchanger, and the second exhaust gas heat exchanger to the waste heat supplying heat exchanger;
   a second waste heat supplying heat exchanger to heat the refrigerant, which is compressed in the compressor during the heating operation of the heat pump type air conditioner; and
   a second heat transfer unit to transfer heat from the remaining one or ones of the cooling water heat exchanger, the first exhaust gas heat exchanger, and the second exhaust gas heat exchanger to the second waste heat supplying heat exchanger.

8. The cogeneration system according to claim 7, wherein the second waste heat supplying heat exchanger comprises a plurality of ones, which are connected in series or in parallel.

9. A cogeneration system comprising:

a heat pump type air conditioner including a compressor, a 4-way valve, an indoor heat exchanger, expansion devices, and an outdoor heat exchanger;

a generator to generate electricity;

a drive source, which operates to drive the generator, and generates waste heat during the operation of the drive source;

a waste heat recoverer to recover the waste heat of the drive source;

a waste heat supplying heat exchanger, which is heated by the waste heat recovered by the waste heat recoverer; and a bypassing unit to guide a refrigerant such that the refrigerant, which is expanded while passing through the expansion devices, during a heating operation of the heat pump type air conditioner, bypasses the outdoor heat exchanger, and enters the 4-way valve after being evaporated in the waste heat supplying heat exchanger, and such that the refrigerant, which is compressed in the compressor during a cooling operation of the heat pump type air conditioner, bypasses the waste heat supplying heat exchanger, and passes through the outdoor heat exchanger while being condensed in the outdoor heat exchanger;

wherein the bypassing unit comprises:

an outdoor heat exchanger bypass conduit to guide the refrigerant, which is expanded by the expansion devices, during the heating operation of the heat pump type air conditioner, to bypass the outdoor heat exchanger;

a waste heat supplying heat exchanger connecting conduit to guide the refrigerant, which is bypassed through the outdoor heat exchanger bypass conduit during the heating operation of the heat pump type air conditioner, to be introduced into the 4-way valve after passing through the waste heat supplying heat exchanger; and a waste heat supplying heat exchanger bypass conduit to guide the refrigerant, which passes through the 4-way valve during the cooling operation of the heat pump type air conditioner, to bypass the waste heat supplying heat exchanger, wherein the bypassing unit comprises:

a first heating operation control valve arranged at the outdoor heat exchanger bypass conduit;

a second heating operation control valve arranged at the waste heat supplying heat exchanger connecting conduit;

a first cooling operation control valve arranged between an inlet of the outdoor heat exchanger bypass conduit and the outdoor heat exchanger;

a second cooling operation control valve arranged between an outlet of the outdoor heat exchanger bypass conduit and the outdoor heat exchanger; and a third cooling operation control valve arranged at the waste heat supplying heat exchanger bypass conduit.

10. The cogeneration system according to claim 9, wherein each of the first and second heating operation control valves, and the first, second and third cooling operation control valves, is an ON/OFF valve.

11. The cogeneration system according to claim 9, further comprising:

a chassis, in which the generator, the drive source, the waste heat recoverer, and the waste heat supplying heat exchanger are arranged, wherein the outdoor heat exchanger bypass conduit, the first heating operation control valve, the first cooling operation control valve, and the second cooling operation control valve are arranged in the heat pump type air conditioner, wherein the waste heat supplying heat exchanger bypass conduit, the second heating operation control valve, and the third cooling operation control valve are arranged in the chassis.

12. The cogeneration system according to claim 9, further comprising:

a chassis, in which the generator, the drive source, the waste heat recoverer, and the waste heat supplying heat exchanger are arranged, wherein the outdoor heat exchanger bypass conduit, the waste heat supplying heat exchanger bypass conduit, the first and second heating operation control valves, and the first, second and third cooling operation control valves are arranged in the heat pump type air conditioner.

13. A cogeneration system comprising:

a heat pump type air conditioner including a compressor, a 4-way valve, an indoor heat exchanger, expansion devices, and an outdoor heat exchanger;

a generator to generate electricity;

a drive source, which operates to drive the generator, and generates waste heat during the operation of the drive source;

a waste heat recoverer to recover the waste heat of the drive source;

a waste heat supplying heat exchanger, which is heated by the waste heat recovered by the waste heat recoverer; and a bypassing unit to guide a refrigerant such that the refrigerant, which is expanded while passing through the expansion devices, during a heating operation of the heat pump type air conditioner, bypasses the outdoor heat exchanger, and enters the 4-way valve after being evaporated in the waste heat supplying heat exchanger, and such that the refrigerant, which is compressed in the compressor during a cooling operation of the heat pump type air conditioner, bypasses the waste heat supplying heat exchanger, and passes through the outdoor heat exchanger while being condensed in the outdoor heat exchanger;

wherein the bypassing unit comprises:

an outdoor heat exchanger bypass conduit to guide the refrigerant, which is expanded by the expansion devices, during the heating operation of the heat pump type air conditioner, to bypass the outdoor heat exchanger;

a waste heat supplying heat exchanger connecting conduit to guide the refrigerant, which is bypassed through the outdoor heat exchanger bypass conduit during the heating operation of the heat pump type air conditioner, to be introduced into the 4-way valve after passing through the waste heat supplying heat exchanger; and a waste heat supplying heat exchanger bypass conduit to guide the refrigerant, which passes through the 4-way valve during the cooling operation of the heat pump type air conditioner, to bypass the waste heat supplying heat exchanger, wherein the bypassing unit comprises:

first and second 3-way valves, respectively arranged at an inlet of the outdoor heat exchanger bypass conduit and an outlet of the outdoor heat exchanger bypass conduit; and third and fourth 3-way valves, respectively arranged at an inlet of the waste heat supplying heat exchanger bypass conduit and an outlet of the waste heat supplying heat exchanger bypass conduit.

14. A cogeneration system comprising:

a generator to generate electricity;

a heat pump type air conditioner, which includes a compressor, a 4-way valve, an indoor heat exchanger, expansion devices, and an outdoor heat exchanger, and operates with the electricity generated from the generator;

a drive source, which operates to drive the generator, and generates waste heat during the operation of the drive source;

a cooling water heat exchanger to recover waste heat of cooling water used to cool the drive source;

a first exhaust gas heat exchanger to recover waste heat of exhaust gas generated from the drive source; and a second exhaust gas heat exchanger to recover the waste heat of the exhaust gas remaining after being absorbed in the first exhaust gas heat exchanger;

a waste heat supplying heat exchanger, which is heated by the waste heat recovered by the waste heat recoverer;

a heat transfer unit to transfer heat from the cooling water heat exchanger, the first exhaust gas heat exchanger, and the second exhaust gas heat exchanger to the waste heat supplying heat exchanger;

a second waste heat supplying heat exchanger to heat the refrigerant, which is compressed in the compressor during the heating operation of the heat pump type air conditioner;

a second, heat transfer unit to transfer heat from the remaining one or ones of the cooling water heat exchanger;

the first exhaust gas heat exchanger, and the second exhaust gas heat exchanger to the second waste heat supplying heat exchanger;

an outdoor heat exchanger bypass conduit to guide the refrigerant, which is expanded by the expansion devices, during the heating operation of the heat pump type air conditioner, to bypass the outdoor heat exchanger;

a waste heat supplying heat exchanger connecting conduit to guide the refrigerant, which is bypassed through the outdoor heat exchanger bypass conduit during the heating operation of the heat pump type air conditioner, to be introduced into the 4-way valve after passing through the waste heat supplying heat exchanger; and a waste heat supplying heat exchanger bypass conduit to guide the refrigerant, which passes through the 4-way valve during the cooling operation of the heat pump type air conditioner, to bypass the waste heat supplying heat exchanger.

15. The cogeneration system according to claim 14, further comprising:

a first heating operation control valve arranged at the outdoor heat exchanger bypass conduit;

a second heating operation control valve arranged at the waste heat supplying heat exchanger connecting conduit;

a first cooling operation control valve arranged between an inlet of the outdoor heat exchanger bypass conduit and the outdoor heat exchanger;

a second cooling operation control valve arranged between an outlet of the outdoor heat exchanger bypass conduit and the outdoor heat exchanger; and a third cooling operation control valve arranged at the waste heat supplying heat exchanger bypass conduit.

16. The cogeneration system according to claim 15, wherein each of the first and second heating operation control valves, and the first, second and third cooling operation control valves, is an ON/OFF valve.

17. The cogeneration system according to claim 14, further comprising:

first and second 3-way valves, respectively arranged at an inlet of the outdoor heat exchanger bypass conduit and an outlet of the outdoor heat exchanger bypass conduit; and third and fourth 3-way valves, respectively arranged at an inlet of the waste heat supplying heat exchanger bypass conduit and an outlet of the waste heat supplying heat exchanger bypass conduit.

* * * * *